United States Patent
Mooney et al.

(10) Patent No.: US 9,901,833 B2
(45) Date of Patent: Feb. 27, 2018

(54) MOTIVATIONAL SCORE

(71) Applicants: William Henry Kelly Mooney, San Francisco, CA (US); David Baszucki, Portola Valley, CA (US)

(72) Inventors: William Henry Kelly Mooney, San Francisco, CA (US); David Baszucki, Portola Valley, CA (US)

(73) Assignee: Roblox Corporation, San Mateo, CA (US)

( * ) Notice: Subject to any disclaimer, the term of this patent is extended or adjusted under 35 U.S.C. 154(b) by 604 days.

(21) Appl. No.: 14/223,395

(22) Filed: Mar. 24, 2014

(65) Prior Publication Data
US 2015/0265929 A1 Sep. 24, 2015

(51) Int. Cl.
*A63F 13/798* (2014.01)
*A63F 13/792* (2014.01)
*A63F 13/35* (2014.01)
*A63F 13/30* (2014.01)

(52) U.S. Cl.
CPC ........... *A63F 13/792* (2014.09); *A63F 13/30* (2014.09); *A63F 13/35* (2014.09); *A63F 2300/575* (2013.01)

(58) Field of Classification Search
CPC . A63F 13/12; A63F 2300/575; A63F 2300/61
USPC ........................................ 463/25, 29, 40–42
See application file for complete search history.

(56) References Cited

U.S. PATENT DOCUMENTS

| | | | | |
|---|---|---|---|---|
| 2011/0244952 A1* | 10/2011 | Schueller | ................ | G07F 17/32 463/27 |
| 2012/0094757 A1* | 4/2012 | Vago | ....................... | A63F 13/12 463/31 |
| 2012/0270661 A1* | 10/2012 | Smith | ..................... | A63F 13/12 463/42 |
| 2012/0277003 A1* | 11/2012 | Eliovits | .................. | A63F 13/79 463/42 |
| 2013/0123018 A1* | 5/2013 | Sareli | .................. | G07F 17/3223 463/42 |

* cited by examiner

*Primary Examiner* — Omkar Deodhar
*Assistant Examiner* — Ross Williams
(74) *Attorney, Agent, or Firm* — Donald R. Boys; Central Coast Patent Agency, LLC

(57) ABSTRACT

A system has a computerized server connected to a network and having a processor, a data repository coupled to the processor, and software (SW) executing on the processor from a non-transitory medium. The software enables a player operating a computerized appliance connected to the network to log in to a site hosted on the server, the site providing video games and other places to which the player may navigate, enables the player to purchase virtual currency spendable in games the player may enter to play and at other places the player may select to navigate, credits the player with Points in a pre-established ratio to virtual currency spent by the player while logged in to the site, and accounts for points accredited to the player and other players, and displaying on the site Point totals for at least players having the greatest number of Points.

10 Claims, 4 Drawing Sheets

MOTIVATIONAL SCORE

BACKGROUND OF THE INVENTION

1. Field of the Invention

The present invention is in the technology area of video gaming, and pertains more particularly to motivating players.

2. Description of Related Art

In video game systems the concept of virtual currency is well know. A player may purchase virtual currency by real cash or credit, for example, at some ratio, and game and enterprise rules may determine how that player may use the currency. One gaming enterprise, for example, may provide a virtual currency they might call V-bucks, at twenty V-bucks for one dollar US. In another circumstance the gaming enterprise might award a player X V-Bucks for any one of certain acts, like scoring points in a game. In some instances V-Bucks may be cashed out for real monetary value or used to purchase real or virtual products, and in others no redemption may be provided.

It has occurred to the inventors that a method and apparatus may be implemented to motivate players to spend more real or virtual currency, which also results in additional real revenue for the host of a gaming site.

BRIEF SUMMARY OF THE INVENTION

In one embodiment of the invention a system is provided, comprising a computerized server connected to a network and having a processor, a data repository coupled to the processor, and software (SW) executing on the processor from a non-transitory medium, the software providing enabling a player operating a computerized appliance connected to the network to log in to a site hosted on the server, the site providing video games and other places to which the player may navigate, enabling the player to purchase virtual currency spendable in games the player may enter to play and at other places the player may select to navigate, crediting the player with Points in a pre-established ratio to virtual currency spent by the player while logged in to the site, and accounting for points accredited to the player and other players, and displaying on the site Point totals for at least players having the greatest number of Points.

In one embodiment the SW provides Points accounting for selectable games to play, Points being allocated to individual games based upon a record of virtual currency spent in said games, the allocated Points awardable in the games to individual players of the games in return for the individual players spending virtual currency in the games. Also in one embodiment a player is a member of a group, and when Points are awarded to the player Points are also awarded to the group. Also in one embodiment the SW maintains a leaderboard for individuals and a leaderboard for groups, and wherein the leaderboards display the leading individuals and groups in terms of Point totals.

In one embodiment one of the other places is a catalogue where a player may purchase real or virtual items, and wherein Points are also awarded to a player in direct ration to virtual currency spent in the catalogue. Also in one embodiment one of the virtual items a player may purchase is a Points trophy valued at a fixed number of Points, and wherein the purchasing player is enabled to award the trophy and Points from the trophy separately to individual ones of players and groups.

In another aspect of the invention a method is provided, comprising steps (a) enabling a player operating a computerized appliance connected to a network to log in to a site hosted on a computerized server having a processor connected to the network, the site providing video games and other places to which the player may navigate;

(b) enabling the player to purchase virtual currency spendable in games the player may enter to play and at other places the player may select to navigate;

(c) crediting the player with Points in a pre-established ratio to virtual currency spent by the player while logged in to the site; and (d) accounting for points accredited to the player and other players, and displaying on the site Point totals for at least players having the greatest number of Points.

In one embodiment of the method the SW provides Points accounting for selectable games to play, Points being allocated to individual games based upon a record of virtual currency spent in said games, the allocated Points awardable in the games to individual players of the games in return for the individual players spending virtual currency in the games. Also in one embodiment a player is a member of a group, and when Points are awarded to the player, Points are also awarded to the group. Still in one embodiment the SW maintains a leaderboard for individuals and a leaderboard for groups, and wherein the leaderboards display the leading individuals and groups in terms of Point totals.

In one embodiment one of the other places is a catalogue where a player may purchase real or virtual items, and wherein Points are also awarded to a player in direct ration to virtual currency spent in the catalogue. Also in one embodiment one of the virtual items a player may purchase is a Points trophy valued at a fixed number of Points, and wherein the purchasing player is enabled to award the trophy and Points from the trophy separately to individual ones of players and groups.

DETAILED DESCRIPTION OF THE INVENTION

Figure 1:
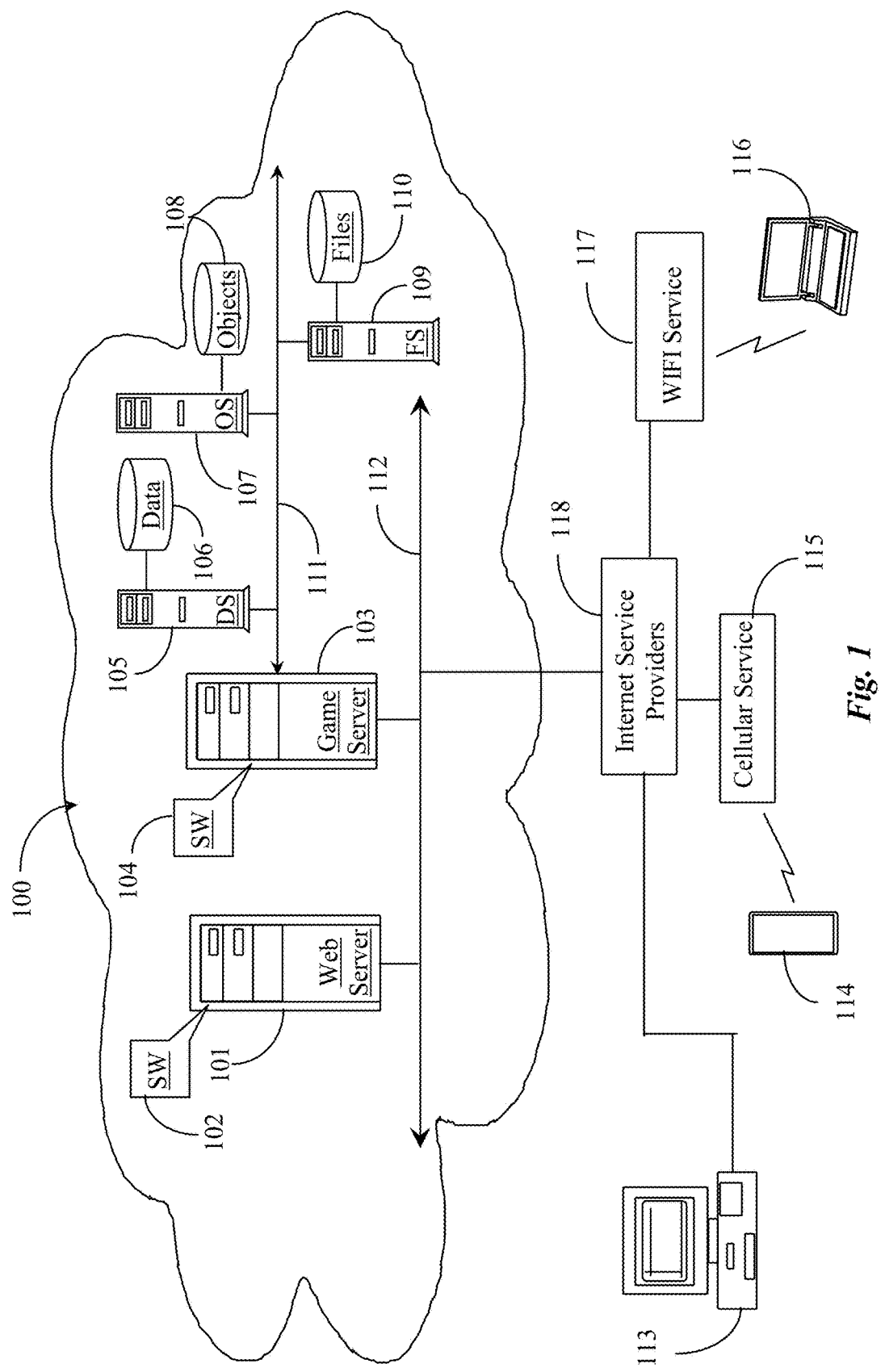
FIG. 1 is an architecture diagram illustrating an arrangement of elements in an embodiment of the invention.

FIG. 1 is an architecture diagram illustrating an arrangement of elements and interconnectivity in an embodiment of the present invention. In this architecture a web server 101 executing software (SW) 102 by a processor from a non-transitory medium provides a web interface in Internet network 100 for a plurality of game players who may access the web site. Servers illustrated in FIG. 1 are shown as interconnected on an Internet backbone 112, which represents all of the networks and dub-nets that make up the Internet network as a whole.

Server 101 in this example is hosted by a gaming enterprise. A game server 103 interacts with server 101 to provide game data to individual players who access server 101 to play. Game server 103 executes SW 104 by a processor from a non-transitory medium. Game server 103 in this example is connected on a Local Area Network (LAN) 111 to a data server 105 coupled to a data repository 106, to an object server 107 connected to a data repository storing digital game objects, and to a file server 109 connected to a data repository storing files that may be required in serving games to players through server 101.

It will be apparent to the skilled person that the arrangement of elements shown in FIG. 1 in the Internet for serving games to players connecting to a web site may be implemented in other ways than that specifically illustrated in FIG. 1, and the arrangement in FIG. 1 is exemplary of all the ways known in the art that this game service may be accomplished.

Players connect to web server 101 from different Internet-capable devices in different ways. In FIG. 1 a general purpose computer 113 is one platform used by gamers. Computer 113 may connect to Internet backbone 112 in a number of ways, such as through a modem operating through a telephone line in a DSL protocol, for example, through a satellite modem, through a cable connection, and in other ways. A smart telephone 114 connecting through a cellular service 115 may also be used to access and play games through web server 101. Another path for gamers may be a laptop computer or a pad device, represented by device 116, which may connect through a WIFI service 117.

Devices 113, 114 and 116 are illustrated in FIG. 1 as connecting through Internet Service Providers 118 to Internet backbone 112, and ISP 118 is meant to represent all of the ways in the art that platforms used by gamers may connect to server 101 to afford a gamer an opportunity to select and play video games.

Figure 2:
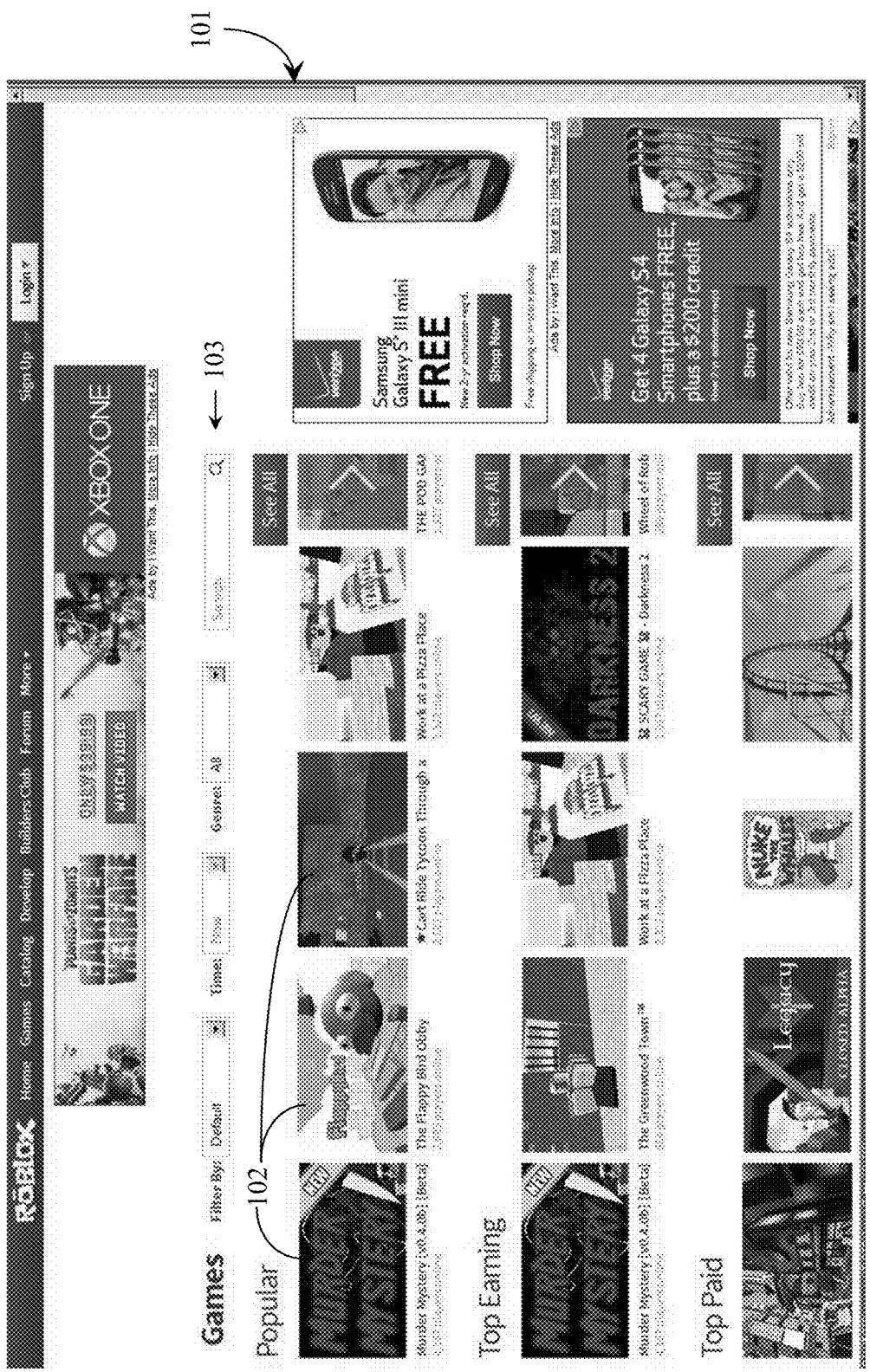
FIG. 2 is a snip of a website of a video gaming site, illustrating a selection of games for a player.

FIG. 2 is a snip 101 of a web page hosted by an enterprise called Roblox™ that provides a gaming web site that, among many other things, enables youthful players to create games, manage playing of the games, and to select and enter individual games as players. For the purpose of description and example it may be assumed that Web server 101 is hosted by the Roblox enterprise.

Games that may be selected to play by an online-connected player in this example are games 102, representing all of the other games displayed as well. Games in this particular case are displayed in groups as "Popular", "Top Earning" and "Top Paid", although these are not all of the games that may be selected to be played, and not all of the groups, as this snip is only a portion of the web page.

In this example there are navigation tools across the top for going to different pages (locations), such as a catalog, a development site, a forum and more. There are also fields 103 with drop-down menus that enable the browsing player to sort the games displayed in different ways.

When a user clicks on one of the games he/she may be taken to another page that provides further information about the game, including for example the game builder's ID, which may be a real name or a gaming alias, the date that the builder joined Roblox, the date the game was created, when updated, favorite, visited, a genre for the game and other information as well. This intermediate page may have a button to begin play, which when initiated may lead the player into play, like, for example, choosing a character as an avatar and presenting game basics and rules, and affording the player to join Roblox if not already a member.

In the Roblox system individual players may create games, and implement rules and functionality in the games they create. This ability to set rules and configuration in games that a player creates is an important aspect of the present invention, described in enabling detail below.

Figure 3:
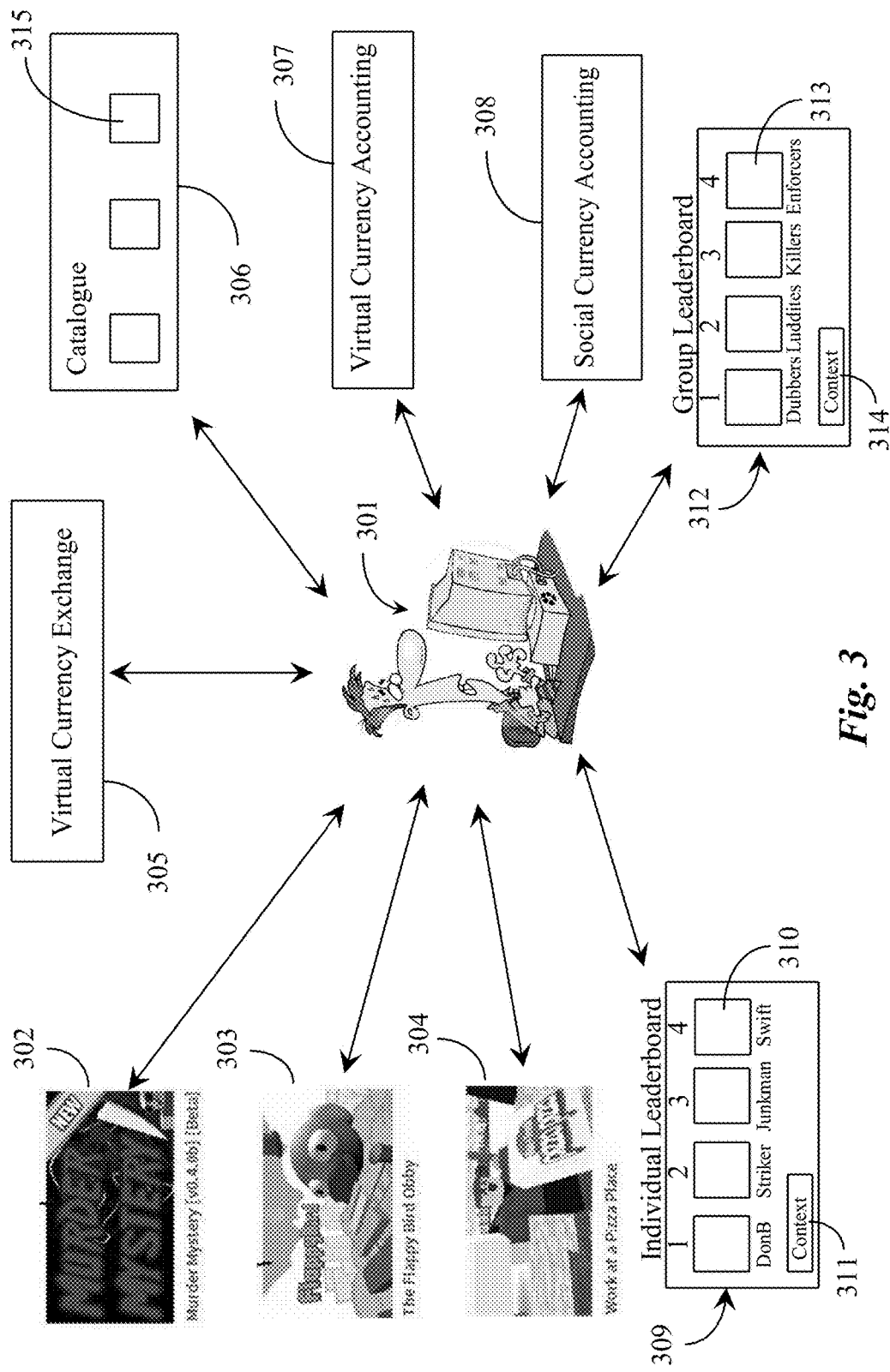
FIG. 3 is a diagram showing a player logged in to a game enterprise site in an embodiment of the invention.

FIG. 3 is a diagram illustrating a game player operating a general-purpose computer 301 who may be considered to be "on-line" and logged in to the Roblox system via server 101, and who has access to the games selection page shown in part in FIG. 2, or to a similar page in another system that allows selection and entry into games. In some embodiments the person may be operating a laptop or pad device or any other platform capable of on-line operation and accessing and playing video games.

Three exemplary games or a usually far greater number that may be entered and played are illustrated in FIG. 3. These are game 302, which is titled "Murder Mystery", game 303, titled "The Flappy Bird Obby" and game 304 titled "Work at a Pizza Place". The double-ended arrows associating the player at appliance 301 are to indicate that the player may at any time and in any order select, enter, play and exit any available game.

The games 302, 303 and 304 are considered places in the system, and there are a number of other places a player may go. One such (not shown in FIG. 3) is a place that facilitates the player creating new games. The creation place provides tools for the player to create games having objects, such as avatars, weapons, buildings and the like, rules, landscape and much more. Such games may be added to the repertoire of games available for other players to play.

Another place players may go is a virtual currency exchange indicated as place 305 in FIG. 3. At the currency exchange the player has access to tools to buy virtual currency by paying with a credit card, for example. Typically there will be a set ratio. In the Roblox system the virtual currency is called Robux (plural of Robuck). A ratio may be any ration a system manager of enterprise may desire, such as 1 cent per Robuck, for example, so $1 US would buy 100 Robux.

Once player 301 buys virtual currency, an account in that player's name is set up in Virtual Currency Accounting 307, which operates somewhat like on-line banking. When a player buys virtual currency the player's account is implemented. That is, the new currency is added to the player's balance in Virtual Currency accounting. When a player spends virtual currency, which a player may do in individual games, or in a Catalogue Place 306, the player's account is decremented. If a player runs out of virtual currency, if that player wants to keep playing to full effect in various games, it becomes imperative to visit Currency Exchange 305 and purchase more virtual currency.

Players in some circumstances have tools that enable them to add functionality to games they create that require other players playing those games to expend virtual currency. In one circumstance, for example, a player in a game may be offered passes at various levels to enhance his or her facility in playing the game, and the passes may be purchased for various amounts of virtual currency. Imagine, for example, that in a particular game, under a particular circumstance, a player must move an avatar across a body of water to advance in the game to a desired conclusion. There may be several ways this may be accomplished in the game. The player may have purchased a Super Pass at the start of the game, which enables that player to accomplish tasks in ways that other players, sans pass, cannot. The Super Pass may enable the player having purchased such a pass to run at the body of water and leap over it, or to walk on water.

In another circumstance a player may rent a boat, for example, which can carry the avatar across the body of water. The rent may be, for example, 10 Robux. The player may also in one circumstance take swimming lessons for a certain price in virtual currency, which will allow the avatar to enter the water and swim across. There are many possibilities. Each time the player spends virtual currency that player's account at 307 is decremented.

Another place a player may spend virtual currency is at a Catalogue place 306. At this place the player can browse for a variety of virtual artifacts or real products that may be offered for sale for virtual currency. One example is a pre-programmed object, such as a form of a transport or a tool that may be used in a game. Another is a mask or a hat that is a real product that may be shipped to the player. In the example of the Roblox system there are thousands of such entities, real and virtual, for sale. The Roblox catalogue may be reviewed by going to Roblox.com and selecting catalog in a command line.

In video gaming systems like the Roblox system, where virtual currency may be purchased for real money, and then may be spent in games and places, a primary source of revenue for the enterprise is the sale of virtual currency for real money. The present inventors reason that any twist or circumstance that will motivate players to purchase and spend virtual currency will contribute to the enterprise's cash flow. The inventors have provided in this regard in the system of their enterprise, new functionality that awards a score to players based on the behavior of those players in spending their virtual currency. In the descriptions that follow, the score created and tracked for players is described as Points.

In a very broad sense in an embodiment of the invention, Points are awarded to players in direct relation to the player spending real or virtual currency. The Points are awarded and other functionality described below is implemented to provide an ego value to players for accumulating Points, and motivating players by Points motivates sinking of virtual currency, which than motivates purchasing more virtual currency. A Points accounting place is implemented to keep accounts for players relative to Points awarded in return for spending, or "sinking" virtual currency. Awarding of Points for sinking virtual currency indirectly incentivizes players to pay money to upgrade their game experience. In one sense accumulation of Points may be considered a score in a Metagame, which consists of the player's playing in different games over time within the enterprise system.

In one embodiment of the system comprising Points, creators of games can implement functionality in the games to award Points. In the accounting system, not only are accounts maintained for player's Points, but Points are granted to games directly proportional to the amount of money the game makes for the enterprise. The points granted to a game may be awarded to individual players for any number of accomplishments, mostly related to "winning" in one way or another. The ways that points are awarded are up to the game creator, but the amount of points that may be awarded in a particular time frame is controlled by the enterprise based on revenue created for the enterprise by the game.

As a simple example of Points to games for awards to players, consider that if a game makes 50 USD for the host enterprise a week, that game might be allotted 500 Points in that week to be awarded to players. The place creator has complete freedom with respect what Points are awarded for. Many different systems may emerge, but one obvious reward structure would be awarding Points to players for winning rounds of a game.

Once awarded, Points cannot be transferred, spent or discarded. Players are in one embodiment ranked with respect to their Points on a global leaderboard 309. This leaderboard is an interactive interface enabling a player to, for example, see how he or she ranks compared to friends (social context) or how he or she ranks compared to players in a geographic zone (World>USA>California). Button 311 is interactive to lead a player to sequential windows where the interested player may discover different issues of context. In this example the leaderboard shows the top four players in Points, with each identified by a player alias. In one embodiment icons 310 may show at least a caricature of the player and may be interactive to enable a player to see the represented player's profile, and other information. In various embodiments the leaderboard is fully functional to reveal all player standings in Points.

In some embodiments players associate in groups (clans) for any one of several purposes, one of which may be to play games together and against other groups. In this association each player may be in only one clan or no clan at all. Member ship in multiple clans is not allowed. Points awarded a player may also associate with a clan to which that player belongs. Leaderboard 312 is a Group or Clan leaderboard illustrating the leading clans in regard to Points. Functionality of leaderboard 312 is similar to functionality of leaderboard 309 described above.

Here is a typical use case in an embodiment of the invention:

A player Joey has been playing a game named "Call of ROBLOXia, a popular team-based shooter game on ROBLOX. Call of ROBLOXia", and this particular game, by virtue of past practice, is enabled to award 10,000 Points per week. The creator of Call of ROBLOXia has decided that the winning team of each round of the game (each round lasts 5 minutes) gets 1 Point each. Joey isn't a very skilled player. In fact, he gets shot a lot and is a drag on his team. He's tired of the status quo, so he opts to purchase an over-powering weapon that shoots flaming chainsaws for 2 USD worth of virtual currency. Joey's team starts to win more often, and they get more Points. The creator of the game is now making more money, so in the future the creator will have more Points to award.

In one embodiment of the invention a player may purchase Points for the virtual currency of the system, and award the purchased Points to other players or clans. A player in this embodiment may, for example, visit catalog 306 and purchase a Point Trophy that will have a fixed value of Points. In one embodiment a process is enabled wherein the player visiting catalog 306 and selecting to buy a point trophy is presented with an interactive interface wherein the player may enter the number of Points desired to purchase, and the system will, in response, create a point trophy valued at that number of Points. Trophies may have an iconic design that will accompany awarding of Points from the purchased trophy, or Points and the trophy may be awarded separately, with the trophy (sans Points) seen as an achievement. In receipt of a request to purchase, the system checks the requesting player's virtual currency account at 307, and if sufficient Robux (for example) are found, the system decrements the player's account by the cost of the trophy. The purchasing player has freedom in awarding the purchased Points to other players of clans.

Clans and Groups may use their entity bank accounts to purchase Point Trophies, which may be awarded at the owner's discretion. Note that players may decide to create a group to allow for mutual contributions to buying a Point trophy. Note further that group v group, clan v clan, etc. contests can have mutual bets created by having each side buy a trophy for ½ (or equivalent) of the total prize pool.

In various embodiments a player's Points score accumulates over time has no direct in-game value and is not directly tied to skill, popularity or money spent. Points may not be traded, sold, or lost. Not every player will receive Points, since they, like ROBUX for example, are a limited currency.

Points cannot be guaranteed to be available to each player. Instead, they are a limited resource that is shared at the discretion of the game maker or Point Trophy purchaser. Game creators create Points by managing to have ROBUX sunk in their game, which creates a Point for every Robuck sunk, if the enterprise has established a 1:1 relationship between Points and the unit of virtual currency. Game creators may award Points in whatever manner they see fit, but may only award Points they actually have. In one embodiment the enterprise does not legislate how the game creator distributes the Points further. Note that Game Creators may award some or all of Points created in their game to themselves. Further to the above, Points created in a game by virtue of virtual currency sunk in that game, may only be awarded in that game.

The enterprise does not apply any Point benefits or requirements, but game makers and players (including clan leaders, etc.) may use Points as a gate for various items. In other words, game creators might restrict playing of their games to players with Points above a certain threshold, and might restrict or enable actions and other variables in their games according to a player's Point ranking. In one embodiment products that may be purchased in catalog 306 may be Point restricted, therefore only available for purchase to players having Points above a threshold.

Figure 4:
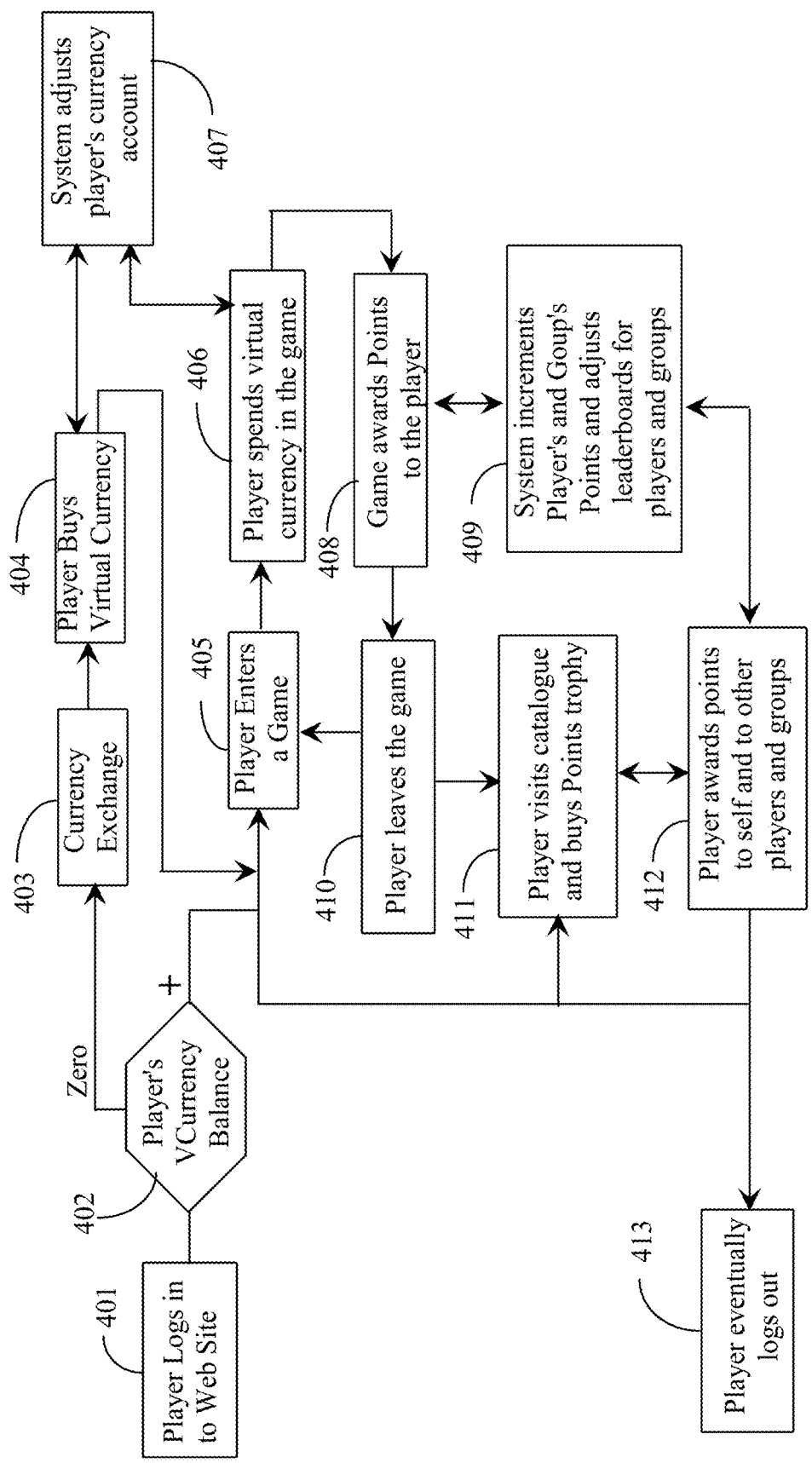
FIG. 4 is a flow diagram illustrating processes in an embodiment of the invention.

FIG. 4 is a flow diagram illustrating processes in an embodiment of the invention. At step 401 a player logs in to an enterprise gaming web site. Once logged in the player has a variety of choices of places to which to navigate. At step 402 the player's Virtual Currency balance may be checked. If the player owns no virtual currency, the player may go to the currency exchange at step 403, and purchase virtual currency for real money at step 404. When the player purchases virtual currency the player's virtual currency balance is adjusted at step 407. The player after purchasing virtual currency may enter a game at step 405.

It will be apparent to the skilled person that a player may go to the Virtual Currency place at any time and purchase more virtual currency whether or not that player has a balance. The player is not restricted to the example shown in FIG. 4.

If at step 402 it is determined the player has a positive virtual currency balance, then the player may enter a game at step 405. There may be games a player may play without virtual currency, but if virtual currency is required for a game, then the system may check before the player can play.

Once the player is in a game at step 405 the player may spend virtual currency in the game at step 406. In some instances payment in virtual currency may be required for any one of a number of different purposes, such as paying a toll before crossing a bridge. In some games a player may buy weapons or passes, or pay to become a super-player with special powers. When the player spends the virtual currency at step 406 the system adjusts the player's balance at step 407.

As described above, a game may be awarded Points by the system to distribute according to revenue generated for the enterprise over time. These Points may be awarded at step 408 in the game to the player spending virtual currency. The game's Points total will be adjusted downward as a result (not shown).

When Points are awarded to a player at step 408 the system increments that player's Points and Points for a Group the player represents, and adjusts leaderboards accordingly.

At step 410 the player may leave the game, but one circumstance may be that the player enters another game at step 405, where the player may spend virtual currency and accrue more Points. The player who has left a game at step 411 may also visit the enterprise Catalogue at step 441. In the Catalogue the player may spend virtual currency for various items for sale, and may be awarded Points for this spending behavior as well. In another circumstance the player may purchase a Points trophy, as described above, and may award the trophy and the Points together or separately to himself or herself, or to other players or Groups. The enterprise system keeps an accounting for all such transactions (step 409). A player may eventually log out as indicated for step 413, but may log in again at any time.

It will be apparent to the skilled person that there are many alterations that may be made in the embodiments described above within the scope of the invention. The embodiments described are exemplary, and do not encompass all possible embodiments of the invention. The scope of the invention is limited only by the claims that follow.

The invention claimed is:

1. A system comprising:
   a computerized server connected to a network and having a processor executing software from a non-transitory medium;
   a data repository coupled to the processor;
   a video game server connected to the network, storing a plurality of video games; and
   a website provided by the software executing on the computerized server, the website hosted by an enterprise and enabling individual ones of players connected to the website to visit a plurality of places, a first place of the plurality being a currency exchange where the player may purchase virtual currency, a second place of the plurality being a virtual store where the player may spend virtual currency for real or virtual products, a third place of the plurality being a points accounting place wherein points are awarded to individual ones of the players in relation to real and virtual currency spent by the player, and a fourth place being a display of links to individual ones of the plurality of games stored at the video game server, individual ones of the games enabling a player of the game to spend virtual currency while playing the game for functionality associated with playing the game, wherein selecting one of the links enables the player to play the video game selected;
   wherein players are awarded points based on total spending of real and virtual currency, including real and virtual currency spent while playing games, and real and virtual currency spent at places enabled by the website while not playing a game, and wherein points totals, and relative rankings of players relative to points awarded, are displayed one or more pages of the website, providing motivation for the players to spend more real and virtual currency, thereby tending to increase real currency paid to the enterprise host of the website.

2. The system of claim 1 wherein the SW provides points accounting for selectable games to play, points being allocated to individual games, as well as to individual players, based upon a record of virtual currency spent by players in said games, the allocated points awardable in the games to individual players of the games in return for the individual players spending virtual currency in the games.

3. The system of claim 2 wherein a player is a member of a group, and when points are awarded to the player points are also awarded to the group.

4. The system of claim 3 wherein the SW maintains a leaderboard for individuals and a leaderboard for groups, and wherein the leaderboards display the leading individuals and groups in terms of point totals.

5. The system of claim 1 wherein one of the virtual items a player may purchase is a points trophy valued at a fixed number of points, and wherein the purchasing player is enabled to award the trophy and points from the trophy separately to individual ones of players and groups.

6. A method comprising:
enabling players operating computerized appliances connected to a network to log in to a web site hosted by an enterprise on a computerized server connected to the network;
enabling individual ones of the players logged in to the web site to purchase virtual currency at a currency exchange;
providing a virtual store where players are enabled to purchase real or virtual products in exchange for virtual currency;
displaying links to players for video games stored at a game engine connected to the network, enabling players to select and play video games associated with the links, individual ones of the video games enabling a player of the game to spend virtual currency while playing the game for functionality associated with playing the game;
tracking real and virtual currency spent by individual players, both while playing games, and while logged in to the web site, but not playing a game;
awarding points to individual players in relation to the real and virtual currency spent by the players;
displaying point totals and relative ranking of players on one or more pages of the website, providing motivation for the players to spend more real and virtual currency, thereby tending to increase real currency paid to the enterprise host of the website.

7. The method of claim 6 wherein the SW provides points accounting for selectable games to play, points being allocated to individual games, as well as to individual players, based upon a record of virtual currency spent by players in said games, the allocated points awardable in the games to individual players of the games in return for the individual players spending virtual currency in the games.

8. The method of claim 7 wherein a player is a member of a group, and when points are awarded to the player points are also awarded to the group.

9. The method of claim 8 wherein the SW maintains a leaderboard for individuals and a leaderboard for groups, and wherein the leaderboards display the leading individuals and groups in terms of point totals.

10. The method of claim 6 wherein one of the virtual items a player may purchase is a points trophy valued at a fixed number of points, and wherein the purchasing player is enabled to award the trophy and points from the trophy separately to individual ones of players and groups.

* * * * *